United States Patent [19]
Horvath et al.

[11] 3,885,474
[45] May 27, 1975

[54] MOTION TRANSMITTING REMOTE CONTROL ASSEMBLY INCLUDING A CABLE CONNECTOR ASSEMBLY

[75] Inventors: Louis T. Horvath, Solon; Robert K. Farrington, Shaker Heights, both of Ohio

[73] Assignee: Teleflex Incorporated, Cleveland, Ohio

[22] Filed: July 16, 1973

[21] Appl. No.: 379,477

[52] U.S. Cl. .................................. 74/501 R; 64/3
[51] Int. Cl. ........................... F16c 1/18; F16c 1/06
[58] Field of Search .......... 74/501 R, 501 P, 480 B; 64/3, 4, 2 R

[56] References Cited
UNITED STATES PATENTS

| | | | |
|---|---|---|---|
| 2,041,385 | 5/1936 | Laanen, Jr. | 74/501 X |
| 2,379,944 | 8/1943 | Wilmott | 64/2 R X |
| 2,509,272 | 5/1950 | Karnuth et al. | 74/501 X |
| 2,692,611 | 10/1954 | Rockwell | 74/501 X |
| 2,865,220 | 12/1958 | Bayley | 74/501 X |
| 2,893,419 | 7/1959 | Coulter | 74/501 X |
| 3,039,318 | 6/1962 | Clarke | 74/501 X |
| 3,364,782 | 1/1968 | Freeland | 74/501 |
| 3,461,687 | 8/1969 | Siegal | 64/4 X |
| 3,567,250 | 3/1971 | Wolf | 74/501 X |

FOREIGN PATENTS OR APPLICATIONS

| | | | |
|---|---|---|---|
| 728,739 | 7/1932 | France | 64/2 R |

*Primary Examiner*—Samuel Scott
*Assistant Examiner*—P. S. Lall
*Attorney, Agent, or Firm*—McGlynn and Milton

[57] ABSTRACT

A Motion Transmitting Remote Control Assembly for transmitting motion along a curved path comprising: a conduit, a flexible cable slidably disposed within a conduit, a control member, and terminal connector means for connecting the cable to the control member; the terminal connector being supported by the control member on opposite sides thereof and including a housing, trunnion means for supporting the housing on opposite sides thereof, and an internally threaded cylindrical member rotatably supported by the housing for securing the threaded end fittings of a cable thereto. The internally threaded cylindrical member includes threaded sections of two diameters to receive two different sized cables, one of the threaded sections extending from the housing a greater distance than the other of the threaded sections to accommodate different length terminal connectors on the ends of the cables.

36 Claims, 10 Drawing Figures

MOTION TRANSMITTING REMOTE CONTROL ASSEMBLY INCLUDING A CABLE CONNECTOR ASSEMBLY

This invention relates to a motion transmitting remote control assembly including a flexible motion transmitting core element for transmitting motion along a curved path. The assembly includes a flexible push-pull core or cable slideably disposed within a flexible conduit. The ends of the flexible conduit are fixed to a mounting structure and the ends of the core element are attached to a control member, which is either a control lever or a controlled member. This invention is particularly directed toward a cable connector for attaching the core element of a motion transmitting remote control assembly to the control or controlled member.

Assemblies of this general description have wide applications in both the automotive and marine industries. For example, in the marine industry push-pull controls and specifically, control levers, are used in small marine vessels, such as, pleasure boats, where they are employed as a combination throttle and clutch control. The control lever is attached for pivotal movement to a mounting bracket near the front of a boat. One end of the core element or cable of the push-pull control is attached to the lever and the other end is attached to a controlled mechanism. Movement of the core element, which is effected by pivotal movement of the lever, transmits tensile and compressive forces to control both the engine speed and to determine the mode (forward, reverse, or neutral) of the engine.

As hereinbefore stated the instant invention is primarily directed to a novel cable connector for connecting the core element to a control or controlled member. Cable connectors adapted for this purpose are well known and may include a housing which rotatably supports an internally threaded sleeve or cylindrical member. The core element is provided with a threaded end fitting which is adapted to be threadedly held within the sleeve. The housing is secured along one side thereof, usually by means of a laterally extending lug, to a member. Inherent in the nature of this manner of attachment is that the tensile and compressive forces tend to twist or torque the cable connector about its point of attachment. The torsional forces to which the cable connector is subjected increases the frictional loads and in many instances necessitates the use of heavier sectioned parts thereby increasing cost and weight of the assembly.

Additionally, in the marine industry it is standard to use push-pull control cables having terminal threaded rods of two particular standard sizes. That is, two different sized diameter cables are commonly used. It has therefore been necessary to manufacture cable connectors of two different sizes and to inventory two different cable connectors. An additional problem arises in that the two sizes of cables are also of different lengths.

It is therefore an object and feature of the instant invention to provide a motion transmitting remote control assembly for transmitting motion along a curved path which includes a conduit, a flexible cable slideably disposed within the conduit, a control member, and terminal connector means for connecting the cable to the control member; the terminal connector means being supported by the control member on opposite sides thereof.

In accordance with the foregoing object and feature it is an additional object and feature of the instant invention to provide terminal connector means including a housing, means for supporting the housing on opposite sides thereof, and cable attachment means supported by the housing wherein the supporting means includes trunnion means for pivotally supporting the housing with respect to the control member.

It is another object and feature of the instant invention to provide terminal connector means including a housing and cable attachment rotatably supported by the housing for attaching a cable thereto; the cable attachment means including means for attachment to cable elements of different sizes.

In accordance with the foregoing object and feature of the instant invention it is an object and feature of the instant invention to provide attachment means including a cylindrical member and an axial bore extending through the cylindrical member, the bore including at least two threaded sections wherein the threaded sections are of different diameters.

Other objects and attendant advantages of the instant invention will be readily appreciated as the same becomes better understood by reference to the following detailed description when considered in connection with the accompanying drawings wherein.

Figure 1:
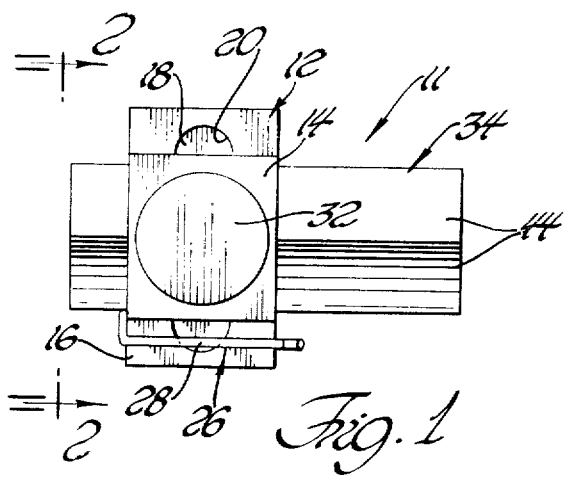
FIG. 1 is a front elevational view of a preferred embodiment of the instant invention in a first position.
Figure 2:
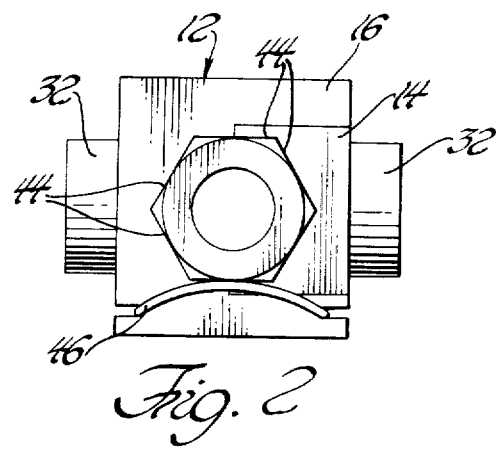
FIG. 2 is a side elevational view taken generally along line 2—2 of FIG. 1.
Figure 3:
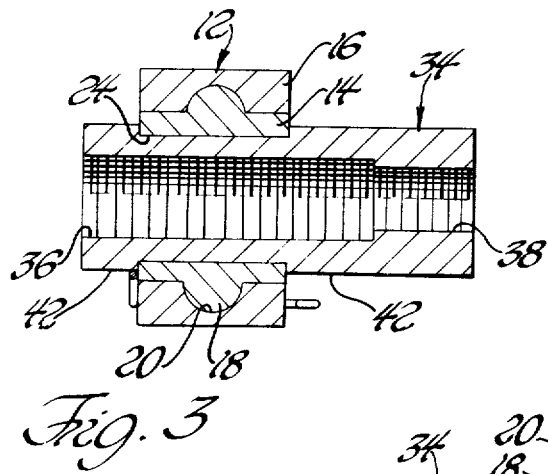
FIG. 3 is a longitudinal cross-sectional view of FIG. 1.
Figure 4:
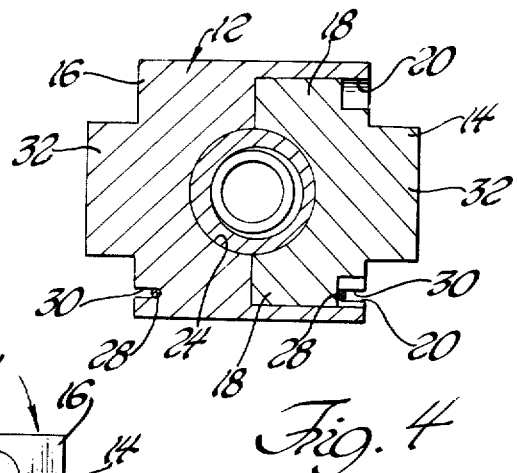
FIG. 4 is a transverse, cross-sectional view of the preferred embodiment of the instant invention as shown in FIG. 1.
Figure 5:
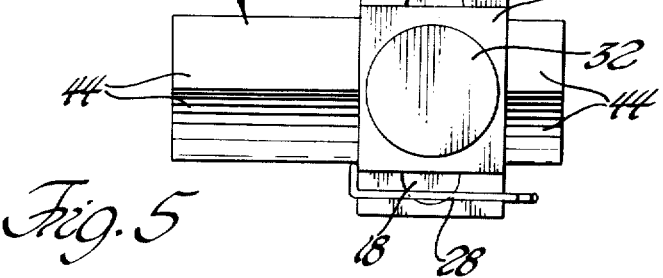
FIG. 5 is a front elevational view of a preferred embodiment of the instant invention in an alternate position.
Figure 6:
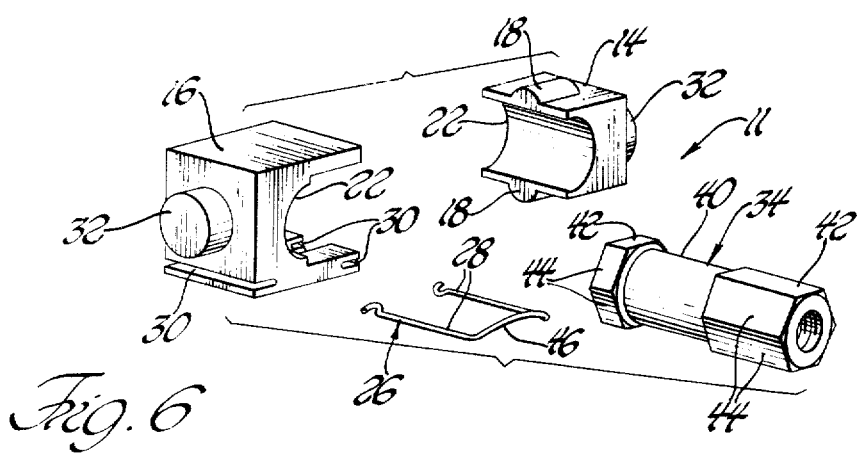
FIG. 6 is an exploded perspective view of a preferred embodiment of the instant invention as shown in FIG. 1.
Figure 7:
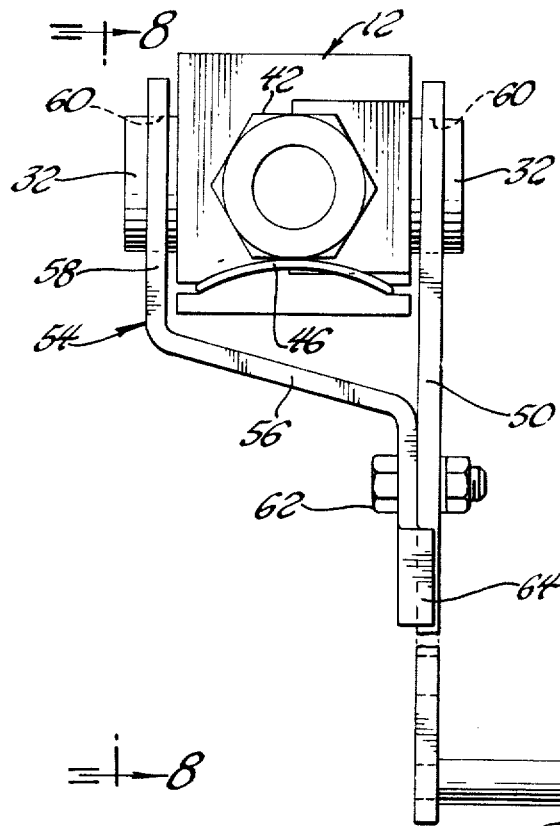
FIG. 7 is a front elevational view of a preferred embodiment of the instant invention supported by a control member in accordance with the teachings of the instant invention.

Referring to the drawings, terminal connector means comprising an adjustable cable connector assembly for connecting a cable to a control member is generally shown at 11.

The cable connector 11 includes a housing generally indicated at 12 which is formed by an assembly including a first portion 14 and a second portion 16. The first portion 14 of the housing 12 includes a pair of keys 18 or arcuate protrusions which are adapted to mate with a pair of keyways 20 or arcuate depressions disposed in the second portion 16 of the housing 12 to facilitate mechanical interlocking engagement between the two portions 14 and 16. Each of the portions 14 and 16 includes an arcuate portion 22 such that when the two portions 14 and 16 are in the assembled position, the arcuate portions 22 define a cylindrical opening or bore 24 extending through the housing.

Locking means comprising a resilient clip member generally indicated at 26 is provided for holding the portions 14 and 16 together in mechanical interlocking engagement. The resilient clip member 26 includes a pair of arms 28 which are adapted to be received in slots 30 disposed in the second portion 16 of the housing 12. One of the slots 30 extends through the second portion 16 adjacent the entrance of one of the keyways 20 such that when the first portion 14 of the housing 12 is disposed in mechanical interlocking engagement with the second portion 16, an arm 28 of the resilient clip member 26 holds the mating key 18 in the keyway 20. The arm 28 of the resilient clip member 26 is thereby adapted to prevent the first portion 14 from sliding out of mechanical interlocking engagement with the second portion 16.

The housing 12 also includes trunnion means comprising the pins or pivot arms 32 for attaching the housing 12 to a control member. One of the pivot arms 32 is disposed on one side of the first portion 14 and the other pivot arm 32 is disposed on one side of the second portion 16 such that the arms are ultimately on opposite sides of the housing 12. The pivot arms 32 are adapted to be rotatably held within aperatures disposed in the control member to which it is attached. It is noted that means other than the pivot arms 32 may be provided to attach the cable connector assembly 11 to the lever while remaining within the spirit of the instant invention. As it will hereinafter become apparent, supporting the housing 12 on opposite sides thereof eliminates the torsional forces which tend to twist the housing 12 about its point of attachment with the control member.

The cable connector assembly 11 includes a cable attachment member comprising a cylindrical member generally indicated at 34 which is rotatably held within the housing 12. The cylindrical member 34 includes a first threaded section 36 and a second threaded section 38, the diameter of the first threaded section 36 being greater than the diameter of the second threaded section 38 such that the cylindrical member 34 is adapted to threadedly receive and retain the threaded end fitting of a push-pull control cable having either of two different diameter sizes. Furthermore, it should be noted that the smaller threaded section 38 extends from the housing 12 a greater distance than the larger section 36.

The exterior surface of the cylindrical member 34 includes an intermediate cylindrical portion 40 which is adapted to be held for rotation in the bore 24 of the housing 12. Furthermore, the cylindrical member 34 includes enlarged end portions 42 disposed adjacent the ends of the intermediate portion 40 for holding the sleeve 34 in the housing 12 and to prevent axial movement thereof with respect to the housing 12. The enlarged portions 42 include tool engaging means comprising tool engaging flats 44 which may be engaged by a suitable open end wrench or the like for rotating the sleeve 34 in the housing 12. The cylindrical member 34 is provided with the tool engaging flats 44 to facilitate engagement of the threaded end fitting of the cable with one of the threaded sections. Subsequent to initial attachment the length of the cable may be adjusted by rotating the cylindrical member 34 thereby causing axial threaded movement of the end fitting within the cylindrical member 34.

To prevent unwanted rotation of the cylindrical member the connecting member 46 of the resilient clip 26 is adapted to engage one of the flats 44 on one of the enlarged portions 42 to resist rotation thereof. Due to the resilience of the resilient clip and particularly the resilience of the arcuately shaped connector member 46, the cylindrical member 34 may be rotated by applying sufficient rotational force thereto. The connecting member 46 of the resilient clip member 26 resiliently moves out of the way to allow the corners of the cylindrical member 34. The connecting member 46 snaps back against one of the flats 44 when rotation of the cylindrical member 34 ceases thereby preventing any further unwanted rotation thereof.

Referring more particularly to FIGS. 7 through 10 the cable connector 11, as described above, is shown in combination with various elements of a motion transmitting remote assembly. The housing 12 of the cable connector 11 is supported by a control member including a lever 50. The lever 50 is connected to a shaft or rod 52 and pivots about an axis which is defined by the shaft 52 whereby rotation of the shaft 52 causes the lever 50 to pivot about said axis. The end of the lever 50 distant from the shaft 52 defines a yoke portion generally indicated at 54 for supporting the cable connector 11 on opposite sides thereof. The yoke portion includes a bracket member 56 which supports an arm 58 parallel to the outer end of the lever 50. The arm 58 and the lever 50 include mutually aligned aperatures for rotatably receiving the pivot arms 32 on the housing 12. The bracket member 56 is fastened to the lever 50 by means of a nut and bolt fastener 62, however, any other suitable fastening means may be employed. The bracket member 56 also includes ears 64 which engage the sides of the lever 50 to prevent rotation of the bracket member 56 relative to the lever 50.

Supporting the housing 12 of the cable connector 11 as described eliminates torsional forces in the horizontal plane through the axis defined by the pivot arm 32 because the housing is supported on two opposite sides rather than on a single side.

Figure 8:
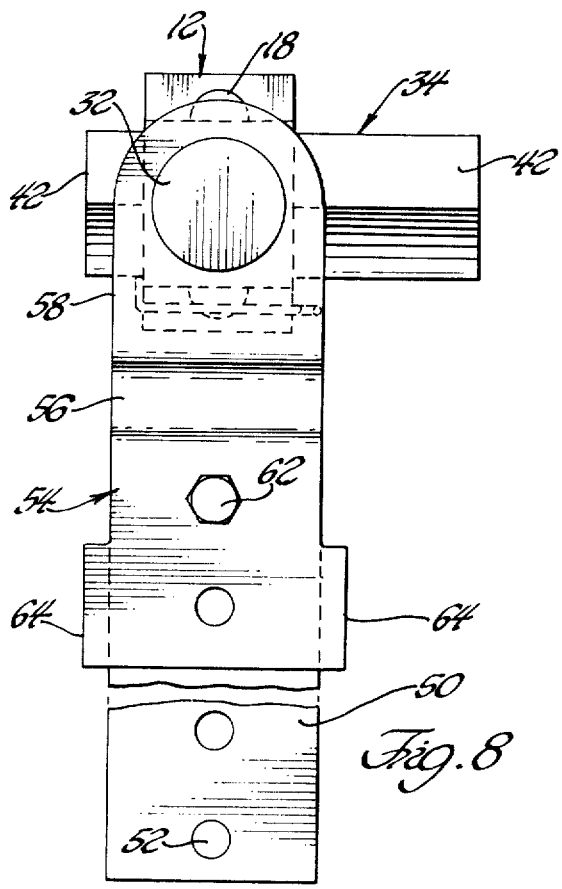
FIG. 8 is a side elevational view taken generally along line 8—8 of FIG. 7.
Figure 9:
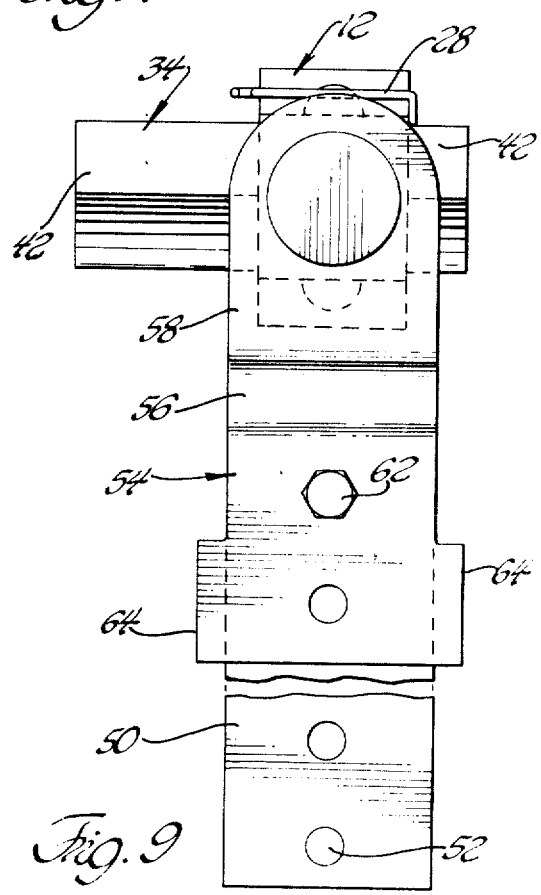
FIG. 9 is a side elevational view similar to FIG. 8 of the instant invention in a moved position.

Additionally, because the housing is rotatably supported by the lever 50 through the trunnion means the cylindrical member 34 may be rotated through 180° from the position shown in FIG. 8 to the position shown in FIG. 9. Consequently, the cable connector is readily adapted to receive either of the two sizes of cables encountered in the final assembly. In other words, the cylindrical member 34 can be rotated so that the appropriately sized threaded section 36 or 38 is presented for engagement with the end fitting of the cable. Additionally, and as mentioned before, the smaller core is also shorter in length than the larger core element. Heretofore the position of the cable connector or the mounting structure had to be moved to accommodate the different length cores. However, since the smaller threaded section 38 has been extended, it will readily receive the shorter core while the larger threaded section 36 is also suited to receive the longer, large core. By employing the cable connector of the instant invention, it is no longer necessary to manufacture or inventory cable connectors of two different sizes or to make other adjustments heretofore necessitated by the use of the two sized core elements. Moreover, the lengths of the two cores are sufficiently different that the possibility of accidentally inserting the cable in the wrong is precluded. Furthermore, should it ever become necessary to change cable sizes the housing 12 is merely rotated to present the other of the two threaded sections for engagement with the cable.

Figure 10:
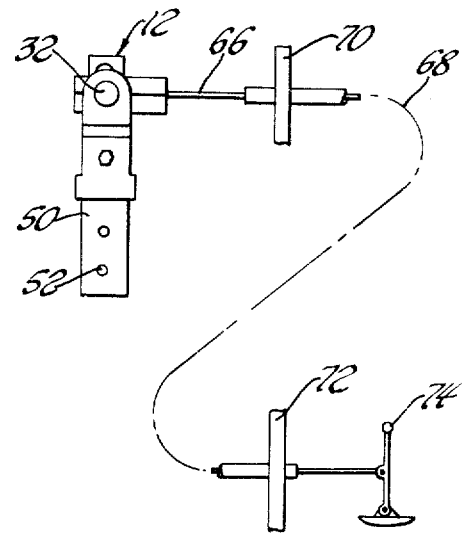
FIG. 10 is a side elevational view of a motion transmitting remote control assembly constructed in accordance with the teachings of the instant invention.

FIG. 10 shows a partially schematic arrangement of the essential elements of a motion transmitting remote control assembly including the cable connector assembly 11. The lever 50 is rotatably supported on the shaft 52 which is rotated by the application of a torsional force thereto. The lever 50 supports the housing 12 of the cable connector 11 on both sides thereof through the pivot arms 32. The cable connector 11 secures one end of a flexible cable 66 to the lever 50. The cable 66 is slidably disposed within a flexible conduit 68 which is secured to stationary or fixed mounting structures, such as bulkheads, at both ends thereof as at 70 and 72. The other end of the cable 66 is attached to a member to be controlled such as to the lever 74 which is merely representative of a controlled member or mechanism. As is apparent, tensile and compressive forces are transferred in known fashion through the cable 66 to the lever 74 by pivoting lever 50 by means of the shaft 52.

The invention has been described in an illustrative manner, and it is to be understood that the terminology which has been used is intended to be in the nature of words of description rather than limitation.

Obviously, modifications and variations in the instant invention are possible, in light of the above teachings. It is, therefore, to be understood that the instant invention may be practiced otherwise than as specifically described yet remain within the scope of the depending claims.

The embodiments of the instant invention in which an exclusive property or privilege is claimed are defined as follows:

1. A motion transmitting remote control assembly for transmitting motion along a curved path comprising: a conduit, a flexible cable slidably disposed within said conduit, a control member, and terminal connector means for connecting said cable to said control member so that said control member moves with said cable; said terminal connector means including a housing, pivotal connection means for connecting said housing to said control member to permit rotation of said housing with respect to said control member about a first axis, and an elongated cable attachment means supported within said housing for rotation about its longitudinal axis, said longitudinal axis of said cable attachment means being disposed transversely to said first axis; said cable attachment means comprising a hollow cylindrical member including a first end having an internal diameter of one size and a second end having an internal diameter of a different size for selectively receiving one of two cables having different sized ends.

2. An assembly as set forth in claim 1 wherein said terminal connector means includes means for preventing axial movement of said cable attachment means with respect to said housing.

3. An assembly as set forth in claim 2 wherein said pivotal connection means includes trunnion means for supporting said housing on opposite sides thereof.

4. An assembly as set forth in claim 3 wherein said trunnion means pivotally supports said housing with respect to said control member.

5. An assembly as set forth in claim 4 wherein said trunnion means includes a pivot arm extending from each of two opposite sides of said housing and said control member includes apertures disposed therein for receiving said pivot arms.

6. An assembly as set forth in claim 5 wherein said cable attachment means includes a cylindrical member and an axial bore extending through said cylindrical member; said bore including first and second threaded sections, said threaded sections being of different diameters.

7. An assembly as set forth in claim 6 wherein one of said threaded sections extends from said housing a greater distance than the other of said sections.

8. An assembly as set forth in claim 6 wherein the diameter of said first threaded section is greater than the diameter of said second threaded section and the axial length of said first threaded section is longer than said second threaded section.

9. An assembly as set forth in claim 8 wherein said second threaded section extends from said housing a greater distance than said first and larger threaded section.

10. An assembly as set forth in claim 1 wherein said housing includes a central bore for rotatably supporting said cable attachment means, said housing including a first portion defining one half of said bore, and a second portion defining the other half of said bore, said first portion being in engagement with said second portion, and locking means for holding said first portion in engagement with said second portion.

11. An assembly as set forth in claim 10 wherein said first portion includes two outwardly facing keys and said second portion includes two inwardly facing keyways for mating engagement with said keys to facilitate mechanical interlocking engagement between said portions, said keys and said keyways extending transversely of said bore.

12. An assembly as set forth in claim 11 wherein said locking means for holding first portion within said second portion includes a resilient clip member having two parallel, spaced-apart arms and a connecting member for connecting said arms.

13. An assembly as set forth in claim 12 wherein one of said arms engages said first portion and the other of said arms engages said second portion.

14. An assembly as set forth in claim 13 wherein said second portion includes slots for receiving said arms, one of said slots communicating with one of said keyways whereby said arm received therein engages one of said mating keys.

15. An assembly as set forth in claim 14 wherein said cable attachment means includes a cylindrical member and a threaded axial bore extending through said cylindrical member.

16. An assembly as set forth in claim 15 wherein said cylindrical member includes an intermediate portion disposed within said bore of said housing.

17. An assembly as set forth in claim 16 wherein said cylindrical member includes enlarged portions disposed adjacent said intermediate portion, said enlarged portions including tool engaging means.

18. An assembly as set forth in claim 16 wherein said cylindrical member includes enlarged portions disposed adjacent said intermediate portion, at least one of said enlarged portions including tool engaging means.

19. An assembly as set forth in claim 18 wherein said tool engaging means includes tool engaging flats.

20. An assembly as set forth in claim 19 wherein said resilient clip member engages one of said tool engaging flats to resist rotational movement of said cylindrical member.

21. An adjustable cable connector assembly for connecting a cable to a control member comprising: a housing, pivotal connection means for connecting said housing to the control member to permit rotation of said housing about a first axis, and an elongated cable attachment means supported within said housing for rotation about its longitudinal axis, said longitudinal axis of said cable attachment means being disposed transversely to said first axis; said cable attachment means comprising a hollow cylindrical member including a first end having an internal diameter of one size and a second end having an internal diameter of a different size for selectively receiving one of two cables having different sized ends.

22. An assembly as set forth in claim 21 wherein said assembly includes means for preventing axial movement of said cable attachment means with respect to said housing.

23. An assembly as set forth in claim 22 wherein said pivotal connection means includes trunnion means including two pivot arms, one extending from each of two opposite sides of said housing, said pivot arms engaging the control member for pivotal movement therewith.

24. An assembly as set forth in claim 21 wherein said cable attachment means includes a cylindrical member and an axial bore extending through said cylindrical member; said bore including at least two threaded sections of different diameters.

25. An assembly as set forth in claim 24 wherein one of said threaded sections extends from said housing a greater distance than the other of said threaded sections.

26. An assembly as set forth in claim 24 wherein said bore includes two threaded sections, the smaller of said threaded sections extending from said housing a greater distance than the larger.

27. An assembly as set forth in claim 21 wherein said housing includes a central bore for rotatably supporting said cable attachment means, said housing including a first portion defining one half of said bore, and a second portion defining the other half of said bore, said first portion being in engagement with said second portion, and locking means for holding said first portion in engagement with said second portion.

28. An assembly as set forth in claim 27 wherein said locking means includes a resilient clip member having two parallel, spaced-apart arms and a connecting member disposed adjacent said cylindrical member for connecting said arms, said arms holding said first portion within said second portion and said connecting member rresisting rotational movement of said cylindrical means.

29. An assembly as set forth in claim 27 wherein said resisting first portion includes two outwardly facing keys and said second portion includes two inwardly facing keyways for mating engagement with said keys to facilitate mechanical interlocking engagement between said portions, said keys and said keyways extending transversely of said bore.

30. An assembly as set forth in claim 29 wherein said locking means includes a resilient clip member having two parallel, spaced-apart arms and a connecting member for connecting said arms.

31. An assembly as set forth in claim 30 wherein one of said arms engages said first portion and the other of said arms engages said second portion, said second portion including slots for receiving said arm, one of said slots communicating with one of said keyways whereby said arm received therein engages one of said mating keys.

32. An assembly as set forth in claim 31 wherein said cable attachment means includes a cylindrical member and an axial bore extending therethrough, said bore including at least two threaded sections wherein said threaded sections are of different diameters.

33. An assembly as set forth in claim 32 wherein said cylindrical member includes an intermediate reduced portion disposed within said bore of said housing.

34. An assembly as set forth in claim 33 wherein said cylindrical member includes portions adjacent said intermediate reduced portions including tool engaging means.

35. An assembly as set forth in claim 34 wherein said tool engaging means comprise tool engaging flats.

36. An assembly as set forth in claim 35 wherein said connecting member of said resilient clip member engages one of said tool engaging flats to resist rotational movement of said cylindrical member.

* * * * *